United States Patent Office 2,865,752
Patented Dec. 23, 1958

2,865,752

LIGHT-ABSORBING ANTHRAQUINONE DYES FOR PHOTOGRAPHIC EMULSIONS

Vernon I. Saunders and Charles V. Wilson, Rochester, N. Y., assignors to Eastman Kodak Company, Rochester, N. Y., a corporation of New Jersey No Drawing. Application October 17, 1955
Serial No. 541,059

10 Claims. (Cl. 96—102)

This invention relates to photographic emulsions, and more particularly to photographic silver halide emulsions containing light-absorbing agents.

In certain photographic processes, the light-scattering caused by the silver halide grains creates considerable difficulty, and it has been proposed in the past to overcome this effect by incorporating various dyes, other than optical sensitizing dyes, in the emulsions. While this practice does overcome the adverse effects of the light-scattering caused by the silver halide, other new difficulties are encountered. In some cases, these dyes leave residual stain, increase background density, and in many cases, a serious loss in speed results due to the desensitizing effect of the dyes.

We have now found that anthraquinone dyes containing at least one alkaline sulfomethylamino group can advantageously be employed in photographic silver halide emulsions without harmful effects for the purpose of overcoming the harmful effects produced by the light-scattering of the silver halide grains.

It is, therefore, an object of our invention to provide photographic silver halide emulsions containing light-absorbing, anthraquinone dyes. A further object is to provide a method for making these emulsions. Other objects will become apparent from the following description and examples.

The beneficial effect of certain of the anthraquinone dyes used in our invention is particularly evident in emulsions which are sensitive to red light (i. e., about 600–700 mu), since most dyes absorbing in this region seem to have a marked desensitizing effect on the emulsions.

The anthraquinone dyes useful in practicing our invention contain at least one alkaline sulfomethylamino group and have their maximum absorption in a region of the spectrum to which the photographic emulsion is sensitive. Due to the alkaline sulfomethylamino group, these dyes generally have a high degree of solubility in water.

By alkaline sulfomethylamino groups, we mean a group represented by the following formula:

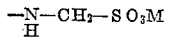

wherein M represents an alkali metal atom (e. g., sodium, potassium, etc.), ammonium ($NH_4$) or organic ammonium salt group (i. e., organic amine salts of the sulfonic acids where M represents hydrogen, such as pyridinium, triethylammonium, etc. salts).

Typical anthraquinone dyes which can be employed in our invention include the following:

(1)
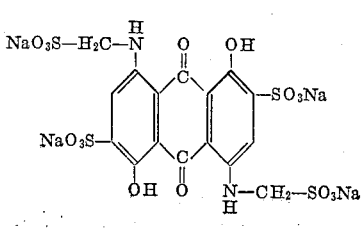

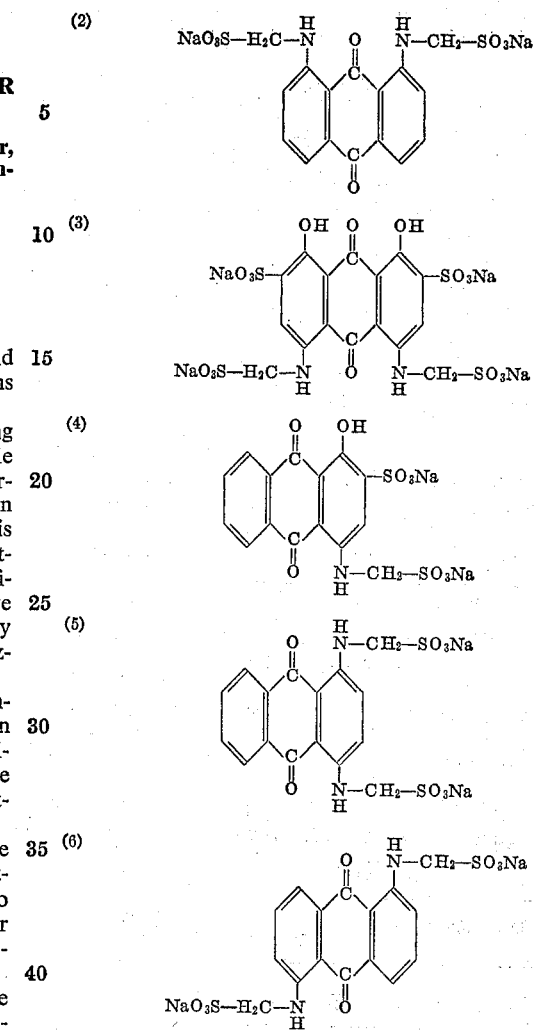

The above dyes can be prepared from the corresponding free amino compounds according to the methods described in British Patent 23,968 of 1899 (accepted October 20, 1900), British Patent 238,717 (accepted August 27, 1925) and German Patent 462,041 (ausgegeben July 5, 1928).

The method of incorporating dyes in emulsions is well known and our invention is not to be limited to any particular means of dispersing the dyes in these emulsions. In general, the dyes can be added directly to the finished, washed emulsions in the form of their aqueous (neutral) solutions. The dyes should be uniformly distributed throughout the emulsions, and if desired, the emulsions can be digested for a short time before coating.

The quantity of anthraquinone dye employed can be varied, depending on the particular emulsion used and the effects desired. In general, from about 1.0 to about 50 grams per gram mole of silver can be employed, although smaller or larger amounts of dye can be used.

The photographic silver halide emulsions employed in our invention can be optically sensitized or unsensitized. The usual optical sensitizing dyes can be used, such as the cyanines, merocyanines, complex (trinuclear) cyanines, complex (trinuclear) merocyanines, styryls, hemicyanines, etc. These dyes can contain the usual basic nuclei, such as thiazole, benzothiazole, naphthothiazole, benzoxazole, naphthoxazole, benzoselenazole, naphthoselenazole, quinoline, etc., or in the case of the merocyanine dyes, such nuclei as rhodanine, 2-thiohydantoin, oxazoledione, pyrazolone, etc. Such dyes, for example, are described in U. S. Patents 2,185,182; 2,241,237; 2,635,961; 2,652,330; 2,666,761; 2,704,715; etc. In general, the anthraquinone dye used should have considerable absorption in the same spectral region to which the optical sensitizing dye sensitizes the emulsion.

The following examples will serve to illustrate the beneficial effect of the anthraquinone dyes of our invention, as compared with other related anthraquinone dyes which have been used for the same purpose.

To different portions of the same batch of photographic gelatino-silver-chlorobromide emulsion (red sensitized) was added an anthraquinone dye, as identified in Table I, the amounts used being given as grams per gram mole of silver. The emulsions were then digested for a short time, and coated on a support, chill set and dried. The emulsions were then exposed through a Wratten No. 70 filter, i. e., a filter which transmits substantially no light of wavelength shorter than about 650 mu, in an Eastman Type Ib sensitometer. The exposed emulsions were then processed in a developer having the following composition:

| | G. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make 1 liter.

The red speed for each of the coatings was then measured and the red filter density of the remaining stain was read in a Model 31B Eastman Kodak Type densitometer through an interference filter transmitting a narrow band of energy at about 620 mu. The last column of the table gives the relative density in gelatin at 650 mu of each of the original coatings, the amount of dye used in each of the coatings being adjusted so that substantially equal absorptions were provided at 650 mu.

Table I

| Coating | Dye (g./g. mol. Ag) | Red Speed | Stain Density | Relative Density |
|---|---|---|---|---|
| (a) | Erio Fast Cyanine S (4.3) | 0.12 | 0.18 | 4.8 |
| (b) | Alizarine Sapphire SESN (5.4) | 0.14 | 0.52 | 4.8 |
| (c) | No. 1 above (6.5) | 0.19 | 0.09 | 4.6 |
| (d) | Control | 0.84 | 0.08 | |

In the above table, the dye used in coating (a) has a Schultz number of 1187, the dye used in coating (b) has a color index number of 1053, and the dye used in coating (c) has a Schultz number of 1189.

In a manner similar to that described for the coatings of Table I above, another series of coatings was prepared containing anthraquinone light-absorbing dyes. These coatings were processed in exactly the same manner as the coatings of Table I except that exposure was made through a Wratten No. 47 filter, i. e., a filter that transmits only light of wavelength 355 to 515 mu, and the residual stain density was read without any filter in the densitometer, i. e., the density is given in the table as white light density. Also, the approximate relative density of the dyes used in the original coatings was read at 500 mu instead of the 650 mu used for the coatings of the dyes in Table I.

Table II

| Coating | Dye (g./g. mol. Ag) | Relative Blue Speed | Stain Density | Relative Density |
|---|---|---|---|---|
| (e) | No. 2 (9.8) | 0.50 | 0.05 | 8.3 |
| (f) | 1,8 - diaminoanthraquinone (11.6) | 0.13 | 0.23 | 8.7 |
| (g) | Control | 1.00 | 0.05 | |

The above tables clearly show that the particular dyes useful in the instant invention provide marked improvements over the dyes previously used in photographic silver halide emulsions for the purpose of absorbing unwanted light has been scattered by the silver halide grains. The data in the tables show that the dyes used in accordance with the instant invention reduce speed less than the comparisons which do not have the sulfomethylamino groups, the loss of speed as compared with the control being due primarily to the absorption of light. The effect of the alkaline sulfomethylamino groups present in the instant dyes can be readily seen by comparing the data given in the tables with that for related dyes, which contain no alkaline sulfomethylamino groups. For example, the dye used in coating (a) of Table I differs from the dye used in coating (c) only in that the former contains free amino groups in the positions which the alkaline sulfomethylamino groups occupy in the dye of coating (c). The same applies to the dyes used in coatings (e) and (f) of Table II.

The sulfomethylation of molecules containing nuclear amino groups by treatment with formaldehyde and sodium bisulfite is a known reaction and may be applied to dyes of any series, such as azo, azine, triphenylmethane, safranin (e. g., phenosafranin, etc.) and so on, although the reactivity of the amino group varies considerably with the structure of the dye. The advantages of increased solubility, decreased staining of gelatin and decreased desensitization are general for dyes treated in this fashion. The anthraquinone dyes of our invention are particularly outstanding in these respects.

While our invention is particularly directed to the ordinarily employed gelatino-silver-silver-halide emulsions, carriers other than gelatin, e. g., a resinous substance or cellulosic material which has no deteriorating effect on the light-sensitive materials can be employed.

Our invention is primarily directed to the ordinarily employed gelatino-silver-halide developing-out emulsions, e. g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with our invention can be coated in the usual manner on any suitable support, e. g., glass, cellulose nitrate film, cellulose acetate film, polyvinylacetal resin film, paper or metal.

Photographic silver halide emulsions, such as those listed above, can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees: "The Theory of the Photographic Process," Macmillan Pub. (1942), page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. Patent 2,640,776, etc.; or mixtures of such addenda. Dispersing agents for color couplers, such as those set forth in U. S. Patents 2,322,027 and 2,304,940, can also be employed in the above-described emulsions.

The advantages of the instant invention are particularly noticeable in photographic processes wherein a separation positive or negative is desired. Of course, the advantages of our invention extend to all photographic silver halide emulsions wherein it is desired to overcome the harmful effects resulting from the light-scattering effects of the silver halide grains.

While anthraquinone dyes which can be used in our invention have been set forth by way of example above, other related dyes can also be used. These can advantageously be represented by the following general formula:

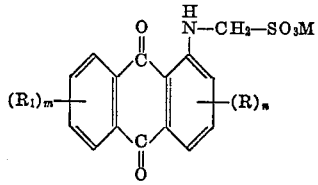

wherein R and R₁ each represents hydrogen, chlorine, bromine, hydroxyl, methyl, ethyl, methoxyl, ethoxyl, sulfo, etc., or an alkaline sulfomethylamino group, and $m$ and $n$ represent a small whole number (e. g., 1 to 3).

What we claim as our invention and desire secured by Letters Patent of the United States is:

1. A photographic silver halide emulsion containing an anthraquinone dye represented by the following general formula:

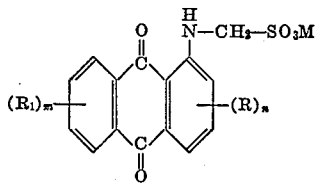

wherein R and R₁ each represents a member selected from the group consisting of a hydrogen atom, a chlorine atom, a bromine atom, a hydroxyl group, a methyl group, an ethyl group, a methoxyl group, an ethoxyl group, a —SO₃M group and a —NHCH₂SO₃M group, $m$ and $n$ each represents a positive integer of from 1 to 3, and M represents a member selected from the group consisting of an alkali metal atom, an ammonium group and an organic ammonium salt group, said anthraquinone dye having its maximum absorption in a region of the spectrum to which said photographic silver halide emulsion is sensitive.

2. A photographic gelatino-silver-halide emulsion optically sensitized to the red-light region of the spectrum, containing an anthraquinone dye as defined in claim 1, said anthraquinone dye having its maximum absorption in the red-light region of the spectrum.

3. A photographic gelatino-silver-halide emulsion optically sensitized to the red-light region of the spectrum containing a water-soluble anthraquinone dye according to claim 2 wherein M represents an alkali metal atom, said anthraquinone dye having its maximum absorption in the red-light region of the spectrum.

4. A photographic silver halide emulsion containing the dye represented by the following formula:

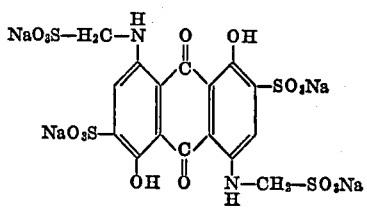

5. A photographic gelatino-solver-halide emulsion optically sensitized to the red-light region of the spectrum containing the dye represented by the following formula:

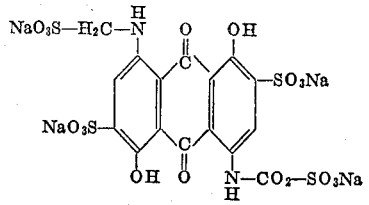

6. A photographic silver halide emulsion containing the dye represented by the following formula:

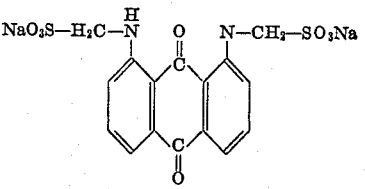

7. A photographic gelatino-silver-halide emulsion having its maximum sensitivity in the blue-light region of the spectrum containing the dye represented by the formula:

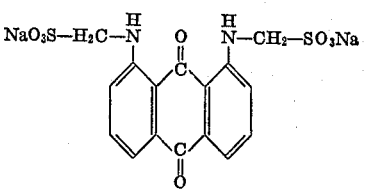

8. A photographic silver halide emulsion containing the dye represented by the following formula:

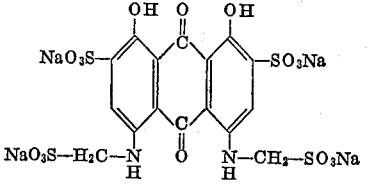

9. A photographic silver halide emulsion containing the dye represented by the following formula:

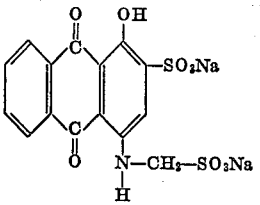

10. A photographic silver halide emulsion containing the dye represented by the following formula:

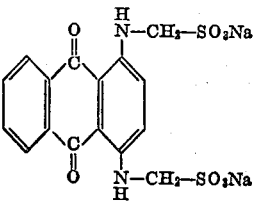

References Cited in the file of this patent
UNITED STATES PATENTS 2,289,397    Weber ------------------ July 14, 1942

UNITED STATES PATENT OFFICE
Certificate of Correction

Patent No. 2,865,752 December 23, 1958

Vernon I. Saunders et al.

It is hereby certified that error appears in the printed specification of the above numbered patent requiring correction and that the said Letters Patent should read as corrected below.

Column 6, lines 3 to 11 inclusive, claim 5, the formula should read as shown below instead of as in the patent:

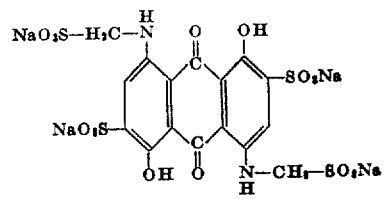

Signed and sealed this 21st day of April 1959.

[SEAL]

Attest:
KARL H. AXLINE,
*Attesting Officer.*

ROBERT C. WATSON,
*Commissioner of Patents.*